United States Patent [19]

Glass

[11] 4,399,060

[45] Aug. 16, 1983

[54] SEMICONDUCTIVE ELASTOMERIC COMPOSITION

[75] Inventor: Gary L. Glass, Stow, Ohio

[73] Assignee: E. I. Du Pont de Nemours & Co., Wilmington, Del.

[21] Appl. No.: 233,220

[22] Filed: Feb. 10, 1981

[51] Int. Cl.$^3$ ............................................. H01B 1/06
[52] U.S. Cl. ............................. 252/511; 174/120 SC; 524/559; 524/523
[58] Field of Search ....................... 252/511, 500, 502; 174/120 SC, 102 SC, 105 SC, 106 SC; 260/42.33, 42.4 Z, 42.29; 524/495, 496, 523, 515, 543, 559, 560

[56] References Cited

U.S. PATENT DOCUMENTS

| | | | |
|---|---|---|---|
| 3,849,333 | 11/1974 | Lloyd et al. | 252/511 |
| 3,904,588 | 9/1975 | Greene | 260/78.5 R |
| 3,951,871 | 4/1976 | Lloyd et al. | 252/511 X |
| 4,150,193 | 4/1979 | Burns | 252/511 X |
| 4,244,861 | 1/1981 | Spenadel et al. | 252/511 X |

*Primary Examiner*—Josephine Barr

[57] ABSTRACT

Semiconductive elastomeric compositions useful as the outer layer on insulated electric cables and suitable for high temperature vulcanization techniques.

10 Claims, No Drawings

SEMICONDUCTIVE ELASTOMERIC COMPOSITION

DESCRIPTION

TECHNICAL FIELD

This invention relates to semiconductive elastomeric compositions which are useful as the outer layer or covering on insulated electric cables. In particular, this invention relates to such compositions based on elastomeric ethylene/alkyl acrylate/monoalkyl ester of 1,4-butenedioic acid copolymers which compositions possess excellent physical properties following vulcanization, and which compositions are particularly well suited for vulcanization at high temperature, i.e., at temperatures substantially above those commonly used in conventional steam-curing.

BACKGROUND ART

U.S. Pat. No. 3,816,347, granted June 11, 1974 to Luh, discloses certain semiconductive elastomeric compositions based on chlorosulfonated polyethylene or chlorinated polyethylene elastomers, which semiconductive elastomeric compositions are useful to form vulcanized semiconductive outer layers on insulated electric cables. Such compositions are generally steam cured at temperatures of 130°–205° C. However, the high temperature thermal instability of such polymer compositions limits their use in new high-temperature curing processes. For example, the temperature of dry nitrogen gas curing commonly exceeds 300° C. These high temperatures are designed to accelerate the rate of curing, but may approach the temperature at which significant degradation of the polymer composition will occur.

U.S. Pat. No. 3,904,588, granted Sept. 9, 1975 to Greene, discloses certain ethylene/alkyl acrylate/monoalkyl ester of 1,4-butenedioic acid copolymers, which copolymers are the basis for the semiconductive elastomeric compositions of the present invention. Greene does not disclose semiconductive compositions based on such copolymers, and perhaps most importantly, although Greene does disclose that the vulcanizates of such copolymers possess good heat aging resistance, Greene does not disclose suitability of such copolymers for high temperature curing.

DISCLOSURE OF THE INVENTION

The present invention relates to semiconductive elastomeric compositions suitable for use as coverings for insulated electric cable which coverings are suited for high temperature vulcanization. In particular, the present invention relates to such semiconductive elastomeric compositions comprising (a) copolymer of ethylene, alkyl acrylate, and monoalkyl ester of 1,4-butenedioic acid,
(b) conductive carbon black,
(c) peroxide curing agent, and preferably
(d) a copolymer of ethylene with propylene and/or an unconjugated diene.

More specifically, the present invention relates to such semiconductive elastomeric compositions and to electric cables having coverings consisting of such semiconductive elastomeric compositions.

The compositions of the present invention form durable and heat-resistant vulcanized semiconductive elastomeric jackets on electric cable in which the conductive metallic core has been coated with a polymeric insulation layer. They adhere to the insulation layer during normal use of the cable and are readily strippable therefrom during conventional installation operations. These compositions are particularly useful where the polymeric insulation layer is peroxide curable, such as polyethylene and EPDM rubber as described in column 3, lines 10–59 of U.S. Pat. No. 3,816,347. In such cable, the insulation layer and the outer semiconductive layer can be vulcanized simultaneously. In addition, where high temperature vulcanization of the insulation layer is used, the semiconductive layer composed of the compositions of the present invention can be vulcanized simultaneously with the insulation layer under such high temperature conditions without significant polymer degradation.

High temperature vulcanization systems, i.e., dry gas systems, utilize pressurized and preheated nitrogen flowing through a heated pipe to vulcanize cable components. These systems offer several advantages over the conventional high pressure steam curing method, including (a) potential for faster cable throughput due to higher operational temperatures, and (b) moisture is not introduced into the cable during curing, thereby minimizing the presence of water-containing voids. With the higher temperatures used for dry gas vulcanization, more thermally stable polymeric insulations, jackets, and semiconductive materials are needed.

More specifically, the semiconductive elastomeric compositions of the present invention comprise
(a) 100 parts by weight of a copolymer of ethylene, an alkyl acrylate and a monoalkyl ester of 1,4-butenedioic acid;
(b) 1 to 10 parts by weight of a peroxide curing agent;
(c) 10 to 150 parts by weight of an electrically conductive carbon black; and
(d) 0 to 100 parts by weight of a copolymer of ethylene with propylene and/or an unconjugated diene.

Component (a) of the present compositions is disclosed in U.S. Pat. No. 3,904,588. The monoalkyl ester of 1,4-butenedioic acid functions as a cure-site monomer and comprises from 0.5 to 10 weight percent of the copolymer. The alkyl group contains from 1 to 6 carbon atoms. Both cis- and trans-1,4-butenedioic acid, i.e., maleic and fumaric acids, can be used. Methyl hydrogen maleate, propyl hydrogen maleate and, most preferably, ethyl hydrogen maleate can be used. The alkyl acrylate copolymer component can be either methyl acrylate or ethyl acrylate. Methyl acrylate is preferred and comprises from about 40 to 62 weight percent, preferably 52 to 58 percent, of the copolymer. Ethylene is the third component of the copolymer and is present in a complementary amount. A particularly preferred copolymer for use in the invention compositions comprises by weight 38.5 to 43.5% of ethylene, 53 to 57% of methyl acrylate and 3.5 to 4.5% of ethyl hydrogen maleate. Such copolymers can be made as described in said U.S. Pat. No. 3,904,588, which is hereby incorporated by reference.

Component (b) consists of about 1 to 10 parts by weight (per 100 parts of Component (a)), preferably 2 to 5 parts, of a peroxide curing agent. Component (b) causes cross-linking of polymer components (a) and optional component (d) when used either alone or in combination with auxiliary curing agents. It includes peroxy compounds from which peroxides are formed during the curing operation such as dicumyl peroxide and ditertiary-butyl peroxide.

Component (d) consists of 0 to about 100 parts by weight (per 100 parts of Component (a)), preferably 0 to 40 parts, of a copolymer containing at least 40 weight percent of ethylene and from 1 to 60 weight percent of propylene and/or an unconjugated diene. Suitable ethylene/propylene and/or diene copolymers are described in the paragraph bridging columns 1 and 2 of U.S. Pat. No. 3,816,347, which is hereby incorporated by reference. EPDM polymer, containing 52 weight percent ethylene, 44 weight percent propylene and 4 weight percent of 1,4-hexadiene, is a particularly preferred ethylene/propylene/diene copolymer. Where the composition of the present invention is intended for use as a covering layer over an EPDM polymer insulation layer, it is preferred that semiconductive composition contain 10 to 40 parts of Component (d).

From 0.5 to 15 parts by weight (per 100 parts of Component (a)), preferably 1 to 5 parts, of the auxiliary nonperoxide curing agent can be used. Such coagents enhance the state of cure obtained with Component (b) and include, for example, N,N'-(m-phenylene)dimaleimide, trimethylol propane trimethacrylate, tetraalkyloxyethane, triallyl cyanurate, tetramethylene diacrylate and polyethylene oxide glycol dimethacrylate.

Component (c) consists of about 10 to 150 parts by weight (per 100 parts of component (a)), preferably 30 to 60 parts, of an electrically conductive carbon black. Conductive furnace blacks are used as Component (c) as well as other types of conductive carbon black such as acetylene blacks.

An internal release system is used to assure good milling behavior and release of the invention compositions from processing equipment, e.g., mill rolls. From 1 to 20 parts by weight (per 100 parts of Component (a)), preferably 1 to 5 parts, of a release system consisting of stearic acid, octadecylamine and microcrystalline wax is preferred.

Other conventional additives such as antioxidants, plasticizers, fillers, pigments and light stabilizers can be present in the invention compositions.

The following examples illustrate the present invention. All parts are by weight unless otherwise indicated. E/MA/MAME copolymer contains from 38.5 to 43.5 weight percent ethylene, 53 to 57 weight percent methyl acrylate, and 3.5 to 4.5 weight percent ethyl hydrogen maleate. The compositions of the present invention were compounded, formed into sandwich assemblies and vulcanized under various conditions over various substrates (e.g., polyethylene and EPDM rubber). Measurements of bond strength to the substrates were made according to ASTM D-413 and compared to industry standards, e.g., AIEC CS6-79. It should be noted that bond strengths obtained from laboratory prepared sandwich assemblies correlate with bond strengths at least 50% higher on commercially produced cable. In addition polymer degradation of the compositions of the present invention under high temperature vulcanization conditions was measured by thermogravimetric analysis and compared to degradation of polymers disclosed in U.S. Pat. No. 3,816,347 under the same conditions.

EXAMPLE 1

An elastomeric composition was prepared by (1) mixing together a masterbatch containing the following ingredients in a Banbury mixer: (a) 100 parts of E/MA/MAME polymer; (b) 15 parts of conductive carbon black (high structure furnace black), and (c) 4.5 parts of a release agent system (1) part stearic acid, 0.5 part octadecylamine, 3 parts microcrystalline wax [82°–88° C. melting point]); (2) allowing the temperature of the mixture to rise to 102° C. during a mixing period of about 7 minutes, (3) banding the mixture on a two-roll mill at 25° C., (4) removing the resulting composition from the mill as a sheet which was then cooled to 23° C.; (5) mixing together the following ingredients in a Banbury mixer: (a) 119.5 parts of the masterbatch prepared above, (b) 4 parts of a release agent system (2 parts stearic acid, 2 parts octadecylamine) (c) 45 parts of conductive carbon black (high structure furnace black), (d) 2 parts butylidenebis(6-t-butyl-m-cresol) antioxidant, (e) 2 parts phenylene dimaleimide, and (f) 3 parts dicumyl peroxide; (6) allowing the temperature of the mixture to rise to 90° C. during a mixing cycle of about 6 minutes, (7) banding the mixture on a two-roll mill at 25° C., and (8) removing the composition from the mill as a sheet whose thickness is 1.52 mm.

Two 10.2 cm×15.2 cm×1.52 mm portions of this sheet were brought into superimposed contact with a 10.2 cm×15.2 cm×0.64 mm sheet of curable insulation material made from a composition containing low density polyethylene resin plus small amounts of thiobis(6-t-butyl-m-cresol) and dicumyl peroxide. The 0.64 mm sheet of insulation material was prepared by cold pressing a 1.52 mm sheet of insulation material at 6.9-10.3 MPa at 121° C. The resulting "sandwich assembly" (insulation material as the middle layer) was cured in a tube of nitrogen at 315° C. and 0.86 MPa for five minutes. A 1.3 cm×15.2 cm strip of the resulting cured composite was tested to determine the bond strength between the inner layer and one of the outer layers. The test method was a 180° C. peel test, pulling at 5.1 cm per minute, per ASTM D-413. The bond strength was found to be 4.9 kN/m, and strippability was easily accomplished.

EXAMPLE 2

Another elastomeric composition was prepared as above except for the following change: In step (5), the ingredients mixed together included 10 parts of an EPDM rubber (52% ethylene, 44% propylene, and 4% 1,4-hexadiene, Mooney viscosity of 25). When the assembly was prepared, cured and tested as described above, the bond strength was found to be 5.3 kN/m, and strippability was easily achieved.

EXAMPLE 3

The elastomeric composition of this example is identical to that described in Example 2. The assembly was prepared and cured as above, except the insulation material was made from a composition containing an EPDM rubber (71% ethylene, 25% propylene and 4% 1,4-hexadiene, Mooney viscosity of 25), zinc oxide, polymerized trimethyl dihydroquinoline antioxidant, silane treated calcined clay, vinyl silane, low density polyethylene resin, paraffin wax, a mixture composed of 90% red lead oxide ($Pb_3O_4$), and 10% EPDM (56% ethylene, 41% propylene, and 3% 1,4-hexadiene, Mooney viscosity of 40), and dicumyl peroxide. The bond strength was found to be 3.9 kN/m, and strippability was easily attained.

EXAMPLE 4

Another elastomeric composition was prepared by (1) mixing together a masterbatch containing the following ingredients in a Banbury mixer: (a) 100 parts of E/MA/MAME polymer, (b) 15 parts of conductive carbon black (high structure furnace black), and (c) 4.5 parts of a release agent system (1 part stearic acid, 0.5 part octadecylamine, 3 parts microcrystalline wax [82°-88° C. melting point]); (2) allowing the temperature of the mixture to rise to 102° C. during a mixing period of about 7 minutes, (3) banding the mixture on a two-roll mill at 25° C., (4) removing the resulting composition from the mill as a sheet which was then cooled to 23° C., (5) mixing together the following ingredients in a Banbury mixer: (a) 119.5 parts of the masterbatch prepared above, (b) 3 parts of a release agent system (2 parts stearic acid, 1 part octadecylamine), (c) 15 parts of conductive carbon black (high structure furnace black), (d) 2 parts butylidenebis(6-t-butyl-m-cresol) antioxidant, (3) 2 parts phenylene dimaleimide, (f) 3 parts dicumyl peroxide, and (g) 40 parts of an EPDM rubber (52% ethylene, 44% propylene, and 4% 1,4-hexadiene, Mooney viscosity of 25), (6) allowing the temperature of the mixture to rise to 90° C. during a mixing cycle of about 6 minutes, (7) banding the mixture on a two-roll mill as a sheet whose thickness was 1.52 mm.

Two 10.2 cm×15.2 cm×1.52 cm portions of the sheet were brought into superimposed contact with a 10.2 cm×15.2 cm×0.64 mm sheet of curable insulation material (cold pressed as in Example 1) made from a composition containing an EPDM rubber (56% ethylene, 41% propylene, and 3% 1,4-hexadiene, Mooney viscosity of 40), zinc oxide, polymerized trimethyldihydroquinoline, silane treated calcined clay, paraffinic process oil, paraffin wax, vinyl silane, a mixture composed of 90% red lead oxide ($Pb_3O_4$), and 10% of said EPDM, and dicumyl peroxide.

The resulting "sandwich assembly" (insulation material as the middle layer) was cured in a tube of nitrogen at 315° C. and 0.86 MPa for five minutes. A 1.3 cm×15.2 cm strip of the resulting cured composite was tested to determine the bond strength between the inner layer and one of the outer layers. The test method was a 180° C. peel test, pulling at 5.1 cm per minute per ASTM D-413. The bond strength was found to be 1.4 kN/m, and strippability was easily achieved.

EXAMPLES 5 TO 9

These examples were conducted according to the procedure of Example 4 using the amounts of conductive carbon black (i.e., total conductive carbon black from the masterbatch and conductive carbon black added as in Example 4, Step 5(c).) and EPDM rubber (52% ethylene, 44% propylene and 4% 1,4-hexadiene, Mooney viscosity of 25) specified in Table I. Three parts of a release agent system consisting of 2 parts of stearic acid and 1 part of octadecylamine was used in step 5(b). Bond strengths in Examples 5 and 6 were determined by placing the elastomeric composition in contact with an insulating material consisting of low density polyethylene, thiobis(6-t-butyl-m-cresol) and dicumyl peroxide. In Examples 7 and 8 the insulating material consisted of an EPDM rubber (71% ethylene, 25% propylene and 4% 1,4-hexadiene), zinc oxide, polymerized trimethyl dihydroquinoline antioxidant, silane treated calcined clay, vinyl silane, low density polyethylene, paraffin wax, a mixture of 90% red lead oxide and 10% EPDM (56% ethylene, 41% propylene and 3% 1,4-hexadiene) and dicumyl peroxide. The insulating material in Example 9 consisted of an EPDM rubber (56% ethylene, 41% propylene and 3% 1,4-hexadiene), zinc oxide, polymerized trimethyldihydroquinoline, silane treated calcined clay, paraffinic process oil, paraffin wax, vinyl silane, a mixture of 90% red lead oxide and 10% of EPDM and dicumyl peroxide. Sandwich assemblies were prepared as in Examples 1-4 and in all cases, bond strengths were satisfactory and the elastomeric compositions were readily strippable from the insulating materials.

TABLE I

| Example No. | EPDM (Parts) | Conductive Carbon Black (Parts) | Insulation Type | Bond Strength kN/m |
|---|---|---|---|---|
| 5 | 0 | 45 | PE | 4.9 |
| 6 | 10 | 60 | PE | 5.6 |
| 7 | 25 | 15 | EPDM[1] | 0.7 |
| 8 | 40 | 60 | EPDM[1] | 3.5 |
| 9 | 40 | 60 | EPDM[2] | 3.2 |

[1] EPDM insulation described in Ex. 3
[2] EPDM insulation described in Ex. 4

EXAMPLES 10-30

Additional elastomeric compositions of the present invention were prepared substantially as described in Examples 1-9 above, except that the ingredients used are as described in Tables II, III, IV, V and VI below. Various parameters were measured and the results are summarized in Tables II, III, IV, V and VI. Not all parameters were measured on all compositions. A dash (-) indicates no measurement taken. Sandwich assemblies were prepared as in Examples 1-9 except for the thickness of the layers. In all of the following examples except Examples 25-30 the thickness of the two semiconductive layers was 1.40 mm each and the thickness of the insulating material layer was 1.02 mm. The insulation layer thickness of 1.02 mm was achieved by cold pressing a slab whose original thickness was 1.40 mm. In Examples 25-30, the thickness of all three layers was 0.76 mm each. Wire indentation was measured by placing No. 12AWG wire on a standard compression set pellet of the semiconductive material. The wire and pellet were then subjected to a pressure of 2.8 MPa for 22 hour at 23° C. The pressure was released and after ½ hour, the depth of the indentation was measured.

TABLE II

| Example | 10 | 11 | 12 | 13 |
|---|---|---|---|---|
| E/MA/MAME polymer comp.[3] | 124 | 124 | 124 | 124 |
| Octadecylamine | 0.5 | 0.5 | 0.5 | 0.5 |
| Stearic Acid | 2 | 2 | 2 | 2 |
| Fatty Alcohol Phosphate | 2 | 2 | 1 | 2 |
| Conductive Carbon Black | 35 | 35 | 35 | 25 |
| N,N'—(m-phenylene)dimaleimide | 2 | 2 | 2 | 2 |
| 40% Dicumyl peroxide on $CaCO_3$ | 7 | — | 7 | 7 |
| 2,5-dimethyl-2,5-di-(t-butylperoxy)hexyne-3 | — | 5 | — | — |
| Mooney Viscosity - ML (1 + 4) at 121° C. | 50 | 51 | 49 | 18 |
| Mooney Scorch - MS at 121° C. | | | | |

TABLE II-continued

| Example | 10 | 11 | 12 | 13 |
|---|---|---|---|---|
| Minimum | 27 | 27 | 26 | 9 |
| Min. to 1 point rise | 24 | >30 | >30 | >30 |
| Min. to 5 point rise | >30 | — | — | — |
| ODR at 177° C., 3° arc, Microdie, 100 cpm (ASTM D-2084) | | | | |
| Minimum torque, N · m | 1.4 | 1.2 | 1.2 | 1.1 |
| Maximum torque, N · m | 4.7 | 8.7 | 10.8 | 8.9 |
| Scorch time - $Ts_2$, min | 1.5 | 2.5 | 2.0 | 1.0 |
| Cure rate - $Tc_{90}$, min | 5.0 | 20.0 | 17.5 | 7.5 |
| Original Physical Properties - Slabs Press Cured 20 min. at 177° C. (ASTM D-412) | | | | |
| 200% Modulus, MPa | 12.8 | 12.1 | 7.2 | 13.2 |
| Tensile Strength, MPa | 16.1 | 19.8 | 21.1 | 15.7 |
| Elongation at Break, % | 300 | 210 | 190 | 230 |
| Compression Set - Pellets Press Cured 25 min. at 177° C.; Method A (2.8 MPa Constant Load), 22 hrs. at 23° C. | | | | |
| % Set (ASTM D-395) | 13 | 6 | 4 | 3 |
| Wire Penetration, mm | 0.41 | 0.20 | 0.18 | 0.18 |
| Volume Resistivity - Slabs Press Cured 25 min. at 177° C. | | | | |
| at 23° C., ohm · m | — | 0.1 | — | 4.7 |
| at 90° C., ohm · m | — | 0.1 | — | 2.0 |
| at 130° C., ohm · m | — | 0.1 | — | 3.7 |
| Adhesion-Assemblies Press Cured 20 min. at 177° C. | | | | |
| Uncured EPDM[1], kN/m | 0.12 | <0.12+ | 0.77 | <0.12+ |

[1]71% ethylene, 25% propylene and 4% 1,4-hexadiene, Mooney viscosity of 25.
[3]100 parts E/MA/MAME copolymer, 20 parts nonconductive carbon black, 4 parts stabilizers and processing aids.
+No adhesion

TABLE III

| Example | 14 | 15 |
|---|---|---|
| E/MA/MAME polymer comp.[4] | 123 | 123 |
| Octadecylamine | 0.5 | 0.5 |
| Stearic Acid | 2 | 2 |
| Fatty Alcohol Phosphate | 2 | 1 |
| 4,4'-butylidene-bis-(6-t-butyl-m-cresol) | 2 | 2 |
| Conductive Carbon Black | 35 | 35 |
| N,N'—(m-phenylene)dimaleimide | 2 | 1.5 |
| 40% Dicumyl peroxide on $CaCO_3$ | 7.5 | 7.5 |
| Mooney Viscosity - ML (1 + 4) at 121° C. | 59 | 35 |
| Mooney Scorch - MS at 121° C. | | |
| Minimum | 31 | 19 |
| Min. to 1 point rise | >30 | >30 |
| ODR at 177° C., 3° arc, Microdie, 100 cpm (ASTM D-2084) | | |
| Minimum torque, N · m | 1.4 | 0.8 |
| Maximum torque, N · m | 5.5 | 4.1 |
| Scorch time - $Ts_2$, min | 1.5 | 1.5 |
| Cure rate - $Tc_{90}$, min | 5.5 | 6.0 |
| Original Physical Properties - Slabs Press Cured 20 min. at 177° C. (ASTM D-412) | | |
| 200% Modulus, MPa | 5.7 | 4.3 |
| Tensile Strength, MPa | 10.7 | 10.6 |
| Elongation at Break, % | 440 | 550 |
| Compression Set - Pellets Press Cured 25 min. at 177° C.; Method A (2.8 MPa Constant Load), 22 hrs. at 23° C. | | |
| % Set (ASTM D-395) | 17 | 17 |
| Wire Penetration, mm | 0.97 | 0.99 |
| Volume Resistivity - Slabs Press Cured 25 min. at 177° C. | | |
| at 23° C., ohm · m | 0.6 | 9.4 |
| at 90° C., ohm · m | 0.3 | 6.3 |
| at 130° C., ohm · m | <0.1 | <0.1 |
| Adhesion-Assemblies Press Cured 20 min. at 177° C. | | |
| Uncured EPDM[1], kN/m | 0.7 | 1.1 |

[1]71% ethylene, 25% propylene and 4% 1,4-hexadiene, Mooney viscosity of 25.
[4]100 parts E/MA/MAME copolymer, 13.5 parts stabilizers and process aids, 10 parts filler.
+No adhesion

TABLE IV

| Example | 16 | 17 | 18 | 19 | 20 | 21 | 22 |
|---|---|---|---|---|---|---|---|
| E/MA/MAME polymer comp.[5] | 124.5 | 124.5 | 124.5 | 124.5 | 124.5 | 124.5 | 124.5 |
| Stearic Acid | 2 | 2 | 2 | 2 | 2 | 2 | 2 |
| Fatty Alcohol Phosphate | 1.0 | 1.0 | 1.0 | 1.0 | 1.0 | 1.0 | — |
| Octadecylamine | 0.5 | 0.5 | 0.5 | 0.5 | 0.5 | 0.5 | 0.5 |
| 4,4'-Butylidene-bis-(6-t-butyl-m-cresol) | 2 | 2 | 2 | 2 | 2 | 2 | 2 |
| Conductive Carbon Black | 20 | 20 | 30 | 40 | 40 | 30 | 30 |
| EPDM rubber[6] | 30 | 10 | 20 | 10 | 30 | 30 | 20 |
| N,N'—(m-phenylene)dimaleimide | 2 | 2 | 2 | 2 | 2 | 2 | 2 |
| Dicumyl peroxide (98–100%) | 3 | 3 | 3 | 3 | 3 | 3 | 3 |
| Mooney Viscosity - ML (1 + 4) at 121° C. | 17 | 19 | 25 | 37 | 31 | 25 | 24 |
| Mooney Scorch - MS at 121° C. | | | | | | | |
| Minimum | 8 | 9 | 13 | 19 | 16 | 13 | 13 |
| Min. to 1 point rise | 28 | 28 | 26 | 25 | 29 | >30 | >30 |
| Min. to 5 point rise | >30 | >30 | >30 | >30 | >30 | — | — |
| ODR at 177° C., 3° arc, Microdie, 100 cpm (ASTM D-2084) | | | | | | | |

TABLE IV-continued

| Example | 16 | 17 | 18 | 19 | 20 | 21 | 22 |
|---|---|---|---|---|---|---|---|
| Minimum torque, N · m | 0.5 | 0.5 | 0.6 | 0.7 | 0.8 | 0.6 | 0.6 |
| Maximum torque, N · m | 3.6 | 3.7 | 4.3 | 4.9 | 4.9 | 5.1 | 4.6 |
| Scorch time - Ts$_2$, min | 1.5 | 1.5 | 1.0 | 1.5 | 1.5 | 1.5 | 1.5 |
| Cure rate - Tc$_{90}$, min | 6.0 | 8.0 | 5.0 | 5.0 | 5.5 | 5.0 | 5.5 |
| Original Physical Properties - Slabs Press Cured 20 min. at 177° C. (ASTM D-412) | | | | | | | |
| 200% Modulus, MPa | 4.4 | 5.2 | 6.5 | 8.6 | 7.0 | 9.2 | 7.6 |
| Tensile Strength, MPa | 8.3 | 9.2 | 10.1 | 11.4 | 10.6 | 12.0 | 13.0 |
| Elongation at Break, % | 340 | 330 | 320 | 300 | 320 | 260 | 380 |
| Compression Set - Pellets Press Cured 25 min. at 177° C.; Method A (2.8 MPa Constant Load), 22 hrs. at 23° C. | | | | | | | |
| % Set (ASTM D-395) | 11 | 12 | 12 | 14 | 11 | 10 | 10 |
| Wire Penetration, mm | 0.10 | 0.08 | 0.13 | 0.15 | 0.15 | 0.38 | 0.10 |
| Volume Resistivity - Slabs Press Cured 25 min. at 177° C. | | | | | | | |
| at 23° C., ohm · m | 5.0 | 1.5 | 0.5 | 1.8 | 0.3 | 8.1 | 1.9 |
| at 90° C., ohm · m | <0.1 | <0.1 | 0.1 | <0.1 | <0.1 | <0.1 | 1.1 |
| at 130° C., ohm · m | <0.1 | 0.2 | <0.1 | <0.1 | <0.1 | <0.1 | 0.4 |
| Adhesion-Assemblies Press Cured 20 min. at 177° C. | | | | | | | |
| Uncured EPDM[2], kN/m | 0.5 | 0.2+ | 0.4 | 0.2+ | 0.5 | 0.2 | — |
| Uncured EPDM[1], kN/m | 0.5 | 0.2+ | 0.4 | 0.2+ | 0.6 | 0.5 | 1.6 |
| Uncured XLPE, kN/m | 3.5++ | 0.9 | 3.5++ | 1.6 | 3.5++ | 2.0 | — |

[1] 71% ethylene, 25% propylene and 4% 1,4-hexadiene, Mooney viscosity of 25.
[2] 56% ethylene, 41% propylene, and 3% 1,4-hexadiene, Mooney viscosity of 40.
[5] 100 pts E/MA/MAME copolymer, 20 pts conductive carbon black, 4.5 stabilizers and processing aids.
[6] 52% ethylene, 44% propylene and 4% 1,4-hexadiene, Mooney viscosity of 25.
+ No Adhesion
++ Stock Tear

TABLE V

| Example | 23 | 24 | 25 | 26 |
|---|---|---|---|---|
| E/MA/MAME polymer comp.[7] | 119.5 | 119.5 | 119.5 | 119.5 |
| Stearic Acid | 2 | 2 | 2 | 2 |
| Octadecylamine | 0.5 | 1.0 | 1.0 | 1.0 |
| 4,4'-Butylidene-bis-(6-t-butyl-m-cresol) | 2 | 2 | 2 | 2 |
| Conductive Carbon Black | 30 | 30 | 30 | 15 |
| EPDM rubber[6] | 20 | 20 | — | 10 |
| N,N'—(m-phenylene)dimaleimide | 2 | 2 | 2 | 2 |
| Dicumyl peroxide (98-100%) | 3 | 3 | 3 | 3 |
| Mooney Viscosity - ML (1 + 4) at 121° C. | 21 | 21 | 25 | 14 |
| Mooney Scorch - MS at 121° C. | | | | |
| Minimum | 11 | 10 | 13 | 8 |
| Min. to 1 point rise | >30 | >30 | >30 | >30 |
| ODR at 177° C., 3° arc, Microdie, 100 cpm (ASTM D-2084) | | | | |
| Minimum torque, N · m | 0.6 | 0.5 | 0.6 | 0.5 |
| Maximum torque, N · m | 4.2 | 3.8 | 4.1 | 3.5 |
| Scorch time - Ts$_2$, min | 1.5 | 1.5 | 2.0 | 1.5 |
| Cure rate - Tc$_{90}$, min | 6.0 | 6.0 | 6.0 | 6.5 |
| Original Physical Properties - Slabs Press Cured 20 min. at 177° C. (ASTM D-412) | | | | |
| 200% Modulus, MPa | 5.6 | 5.2 | 6.0 | 3.3 |
| Tensile Strength, MPa | 12.6 | 11.7 | 12.8 | 11.9 |
| Elongation at Break, % | 460 | 460 | 470 | 540 |
| Compression Set - Pellets Press Cured 25 min. at 177° C.; Method A (2.8 MPa Constant Load), 22 hrs. at 23° C. | | | | |
| % Set (ASTM D-395) | 11 | 12 | — | — |
| Wire Penetration, mm | 0.08 | 0.13 | — | — |
| Volume Resistivity - Slabs Press Cured 25 min. at 177° C. | | | | |
| at 23° C., ohm · m | 1.7 | 1.0 | 1.1 | 14.3 |
| at 90° C., ohm · m | 1.8 | 1.8 | 1.3 | 19.5 |
| at 130° C., ohm · m | 0.6 | 0.4 | 0.2 | 4.2 |
| Adhesion-Assemblies Press Cured 20 min. at 177° C. | | | | |
| Uncured EPDM,[2] kN/m | — | — | — | — |
| Uncured EPDM,[1] kN/m | 1.7 | 0.9 | — | — |
| Uncured XLPE, kN/m | — | — | — | — |
| Adhesion - Assemblies Cured 5 min. in Nitrogen at 0.9 MPa and 315° C. | | | | |

TABLE V-continued

| Example | 23 | 24 | 25 | 26 |
|---|---|---|---|---|
| Uncured XLPE, kN/m | — | — | 3.5++ | 3.5++ |

+No Adhesion
++Stock Tear
+++Cured 10 minutes in Nitrogen at 0.9 MPa and 315° C.
[1]71% ethylene, 25% propylene and 4% 1,4-hexadiene, Mooney viscosity of 25.
[2]56% ethylene, 41% propylene, and 3% 1,4-hexadiene, Mooney viscosity of 40.
[6]52% ethylene, 44% propylene and 4% 1,4-hexadiene, Mooney viscosity of 25.
[7]100 pts E/MA/MAME, 15 pts conductive carbon black, 4.5 pts stabilizers and processing aids

TABLE VI

| Example | 27 | 28 | 29 | 30 |
|---|---|---|---|---|
| E/MA/MAME polymer comp.[7] | 119.5 | 119.5 | 119.5 | 119.5 |
| Stearic Acid | 2 | 2 | 2 | 2 |
| Octadecylamine | 1.0 | 1.0 | 1.0 | 1.0 |
| 4,4'-Butylidene-bis-(6-t-butyl-m-cresol) | 2 | 2 | 2 | 2 |
| Conductive Carbon Black | 45 | 30 | 45 | 15 |
| EPDM rubber[6] | 10 | 25 | 40 | 40 |
| N,N'—(m-phenylene)dimaleimide | 2 | 2 | 2 | 2 |
| Dicumyl peroxide (98–100%) | 3 | 3 | 3 | 3 |
| Mooney Viscosity - ML (1 + 4) at 121° C. | 45 | 23 | 35 | 15 |
| Mooney Scorch - MS at 121° C. | | | | |
| Minimum | 24 | 12 | 17 | 6 |
| Min. to 1 point rise | >30 | >30 | >30 | >30 |
| ODR at 177° C., 3° arc, Microdie, 100 cpm (ASTM D-2084) | | | | |
| Minimum torque, N · m | 0.8 | 0.6 | 0.8 | 0.3 |
| Maximum torque, N · m | 5.0 | 4.2 | 5.1 | 3.3 |
| Scorch time - Ts$_2$, min | 1.5 | 2.0 | 1.5 | 2.0 |
| Cure rate - Tc$_{90}$, min | 6.0 | 6.5 | 6.5 | 7.5 |
| Original Physical Properties - Slabs Press Cured 20 min. at 177° C. (ASTM D-412) | | | | |
| 200% Modulus, MPa | 8.1 | 5.0 | 6.1 | 2.3 |
| Tensile Strength, MPa | 13.3 | 12.6 | 13.4 | 9.6 |
| Elongation at Break, % | 400 | 500 | 480 | 520 |
| Volume Resistivity - Slabs Press Cured 25 min. at 177° C. | | | | |
| at 23° C., ohm · m | 0.1 | 1.2 | 0.6 | 210.0 |
| at 90° C., ohm · m | 0.1 | 0.7 | 0.3 | 63.9 |
| at 130° C., ohm · m | 0.1 | 0.7 | 0.1 | 16.4 |
| Adhesion - Assemblies Cured 5 min. in Nitrogen at 0.9 MPa and 315° C. | | | | |
| Uncured EPDM,[2] kN/m | — | 1.1 | — | 1.4 |
| Uncured EPDM,[1] kN/m | 1.2 | 1.2 | 1.1 | — |
| | (1.4)+++ | | (1.1)+++ | |
| Uncured XLPE, kN/m | >4.2++ | — | — | — |

+No Adhesion
++Stock Tear
+++Cured 10 minutes in Nitrogen at 0.9 MPa and 315° C.
[1]71% ethylene, 25% propylene and 4% 1,4-hexadiene, Mooney viscosity of 25.
[2]56% ethylene, 41% propylene and 3% 1,4-hexadiene, Mooney viscosity of 25.
[6]52% ethylene, 44% propylene and 4% 1,4 hexadiene, Mooney viscosity of 25.
[7]100 pts E/MA/MAME, 15 pts conductive carbon black, 4.5 pts stabilizers and processing aids.

EXAMPLES 31–36

Three semiconductive elastomeric compositions of the present invention and three semiconductive elastomeric compositions based on chlorosulfonated polyethylene were prepared substantially as described above and were subjected to thermogravimetric analysis at temperatures from 250° C. to 375° C. to evaluate the relative thermal stability of such compositions under high temperature curing conditions. The compositions and the data obtained from such thermogravimetric analysis are summarized in Table VII.

TABLE VII

| Example | 31 | 32 | 33 | 34 | 35 | 36 |
|---|---|---|---|---|---|---|
| E/MA/MAME polymer comp.[7] | 119.5 | 119.5 | 119.5 | — | — | — |
| Chlorosulfonated polyethylene | — | — | — | 100 | 100 | 100 |
| EPDM[6] | — | 40 | 10 | — | 40 | 10 |
| Litharge (dispersed on polymeric binder) | — | — | — | 25 | 25 | 25 |
| Epoxy resin | — | — | — | 5 | 5 | 5 |
| 4,4'-Butylidene-bis-(6-t-butyl-m-cresol) | 2 | 2 | 2 | — | — | — |
| Stearic Acid | 2 | 2 | 2 | — | — | — |
| Octadecylamine | 2 | 2 | 2 | — | — | — |
| Conductive carbon black | 45 | 15 | 45 | 60 | 30 | 60 |
| Naphthenic Process Oil | — | — | — | 15 | 15 | 15 |
| Paraffin Wax | — | — | — | 3 | 3 | 3 |

TABLE VII-continued

| Example | 31 | 32 | 33 | 34 | 35 | 36 |
|---|---|---|---|---|---|---|
| PE-617A (Low M.W. PE) | — | — | — | 2 | 2 | 2 |
| Triallylcyanurate | — | — | — | 2 | 2 | 2 |
| N,N'—(m-phenylene)dimaleimide | 2 | 2 | 2 | — | — | — |
| t-butylperoxydiisopropyl benzene | — | — | — | 3 | 3 | 3 |
| Dicumyl peroxide (98–100%) | 3 | 3 | 3 | — | — | — |
| Thermogravimetric Analysis Nitrogen Atmosphere, Weight Loss in Percent, After 60 Minutes at °C. | | | | | | |
| 250° C. | 4.4 | 4.0 | 3.9 | 7.3 | 7.9 | 7.6 |
| 300° C. | 6.2 | 6.2 | 6.0 | 15.8 | 14.0 | 13.8 |
| 325° C. | 7.2 | 7.3 | 6.8 | 22.8 | 21.4 | 21.4 |
| 375° C. | 11.9 | 10.6 | 10.6 | 29.5 | 27.5 | 27.5 |

[6]52% ethylene, 44% propylene and 4% 1,4 hexadiene, Mooney viscosity of 25.
[7]100 pts E/MA/MAME, 15 pts conductive carbon black, 4.5 pts stabilizers and processing aids.

INDUSTRIAL APPLICABILITY

The semiconductive compositions of the present invention can be used as the outer layer of insulated electric cable. These compositions are particularly useful where the insulation layer is peroxide curable, such as polyethylene or EPDM rubber, and further where the insulation layer and the outer semiconductive layer are cured by high temperature techniques.

BEST MODE

Although the best mode of the present invention, i.e., the single best composition of the present invention, will depend on the particular desired end use and the specific requisite combination of properties for that use, the most preferred composition for use over crosslinked polyethylene insulation is that described in Example 1. The most preferred composition for use over semi-crystalline EPDM insulation is that described in Example 3 and the most preferred composition for use over amorphous EPDM insulation is Example 9.

I claim:

1. Semiconductive elastomeric composition comprising:
   (a) 100 parts by weight of a copolymer of ethylene, 40–62 weight percent of an alkyl acrylate and 0.5–10 weight percent of a monoalkyl ester of 1,4-butenedioic acid;
   (b) 1 to 10 parts by weight of a peroxide curing agent;
   (c) 10 to 150 parts by weight of an electrically conductive carbon black; and
   (d) 0 to 100 parts by weight of a copolymer of ethylene with propylene and/or an unconjugated diene.

2. Composition of claim 1 wherein component (d) comprises 0 to 40 parts by weight.

3. Composition of claim 1 wherein component (d) comprises 10 to 40 parts by weight.

4. Composition of claim 1 further comprising 0.5–15 parts by weight of an auxiliary non-peroxide curing agent.

5. Composition of claim 1 further comprising 1–20 parts by weight of a release agent system.

6. Composition of claim 1 further comprising at least one additive selected from the group consisting of antioxidants, plasticizers, fillers, pigments and light stabilizers.

7. Composition of claim 1 wherein component (a) is a copolymer containing 38.5–43.5 weight percent ethylene, 53–57 weight percent methyl acrylate and 3.5–4.5 weight percent ethyl hydrogen maleate.

8. Composition of claim 1 wherein component (d) is a copolymer of ethylene, propylene and 1,4-hexadiene.

9. Electrical cable having a conductive metallic core, an insulation layer concentric with and outside of said core, and a semi-conductive layer contiguous with and outside said insulation layer, said semi-conductive layer consisting of the elastomeric composition of claim 1.

10. The electrical cable of claim 9 wherein the insulating layer consists essentially of a polymer selected from the group consisting of crosslinked polyethylene and EPDM rubber.

* * * * *